United States Patent
Mizuno et al.

(10) Patent No.: US 11,904,211 B2
(45) Date of Patent: Feb. 20, 2024

(54) GOLF BALL MATERIAL, METHOD FOR PRODUCING THE SAME, AND GOLF BALL

(71) Applicant: Bridgestone Sports Co., Ltd., Tokyo (JP)

(72) Inventors: Yuki Mizuno, Saitamaken (JP); Atsushi Namba, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 62 days.

(21) Appl. No.: 17/749,762

(22) Filed: May 20, 2022

(65) Prior Publication Data

US 2022/0379172 A1    Dec. 1, 2022

(30) Foreign Application Priority Data

May 28, 2021 (JP) ................. 2021-089776

(51) Int. Cl.

| | |
|---|---|
| A63B 37/06 | (2006.01) |
| A63B 37/00 | (2006.01) |
| C08L 23/08 | (2006.01) |
| C08L 77/02 | (2006.01) |
| B29B 7/90 | (2006.01) |
| B29C 45/00 | (2006.01) |
| B29C 45/16 | (2006.01) |
| B29L 31/54 | (2006.01) |
| B29K 101/12 | (2006.01) |

(52) U.S. Cl.
CPC ............ *A63B 37/0024* (2013.01); *B29B 7/90* (2013.01); *B29C 45/0001* (2013.01); *B29C 45/16* (2013.01); *C08L 23/083* (2013.01); *C08L 77/02* (2013.01); *A63B 2209/00* (2013.01); *B29K 2101/12* (2013.01); *B29L 2031/546* (2013.01); *C08L 2312/00* (2013.01); *C08L 2314/06* (2013.01)

(58) Field of Classification Search
CPC ..................... A63B 37/0023; A63B 37/0024
See application file for complete search history.

(56) References Cited

U.S. PATENT DOCUMENTS

| | | |
|---|---|---|
| 6,663,510 B1 | 12/2003 | Iwami et al. |
| 2001/0031670 A1 | 10/2001 | Iwami et al. |
| 2002/0013421 A1 | 1/2002 | Takesue et al. |

(Continued)

FOREIGN PATENT DOCUMENTS

| | | |
|---|---|---|
| JP | 2001-095948 A | 4/2001 |
| JP | 2001-120686 A | 5/2001 |

(Continued)

*Primary Examiner* — Raeann Gorden
(74) *Attorney, Agent, or Firm* — Sughrue Mion, PLLC (57) ABSTRACT

A golf ball material contains (i) fine particles that have an average particle size of less than 300 μm and are composed of a crosslinked multi-component copolymer having conjugated diene units, non-conjugated olefin units and aromatic vinyl units; and (ii) a thermoplastic resin. The conjugated diene units include butadiene units, the non-conjugated olefin units include units selected from the group consisting of ethylene, propylene and 1-butene units, the aromatic vinyl units include styrene units, and the content of the conjugated diene units in the multi-component copolymer is 5 wt % or more. This golf ball material is soft, has an excellent rebound resilience and also has a good processability.

7 Claims, 2 Drawing Sheets

(56) References Cited

U.S. PATENT DOCUMENTS

| | | | |
|---|---|---|---|
| 2003/0073517 A1* | 4/2003 | Ichikawa | A63B 37/0003 |
| | | | 473/378 |
| 2005/0119399 A1* | 6/2005 | Nishioka | C08L 21/00 |
| | | | 524/502 |
| 2005/0256269 A1 | 11/2005 | Takesue et al. | |
| 2018/0282456 A1* | 10/2018 | Horikawa | C08F 297/06 |
| 2018/0291185 A1 | 10/2018 | Horikawa et al. | |

FOREIGN PATENT DOCUMENTS

| JP | 2001-327631 A | 11/2001 |
|---|---|---|
| JP | 2001-348467 A | 12/2001 |
| JP | 6780827 B2 | 11/2020 |

* cited by examiner

GOLF BALL MATERIAL, METHOD FOR PRODUCING THE SAME, AND GOLF BALL

CROSS-REFERENCE TO RELATED APPLICATION

This non-provisional application claims priority under 35 U.S.C. § 119(a) on Patent Application No. 2021-089776 filed in Japan on May 28, 2021, the entire contents of which are hereby incorporated by reference.

TECHNICAL FIELD

The present invention relates to a golf ball material, a method for producing the material and a golf ball made with the material. More specifically, the invention relates to a golf ball material that can be suitably used as the material making up a cover layer (intermediate layer or outermost layer) in a golf ball having a core encased by a cover of one, two or more layers, and to a golf ball made using this material.

BACKGROUND ART

In order to achieve golf balls endowed with both a soft feel at impact and a high rebound, materials prepared by the addition of a hydrogenated aromatic vinyl elastomer such as a styrene-ethylene-butylene-styrene block copolymer (SEBS) to an ionomer resin have been described. Resin compositions obtained by blending a thermoplastic elastomer such as SEBS and a tackifier in an ionomer resin are disclosed in, for example, JP-A 2001-95948 and JP-A 2001-327631.

When SEBS is added to an ionomer resin, a soft feel can be imparted, but the addition of a large amount of SEBS has the undesirable effect of lowering the rebound.

Also, materials in which the acid in an ionomer resin composition is completely neutralized by adding a fatty acid to the ionomer resin composition have been disclosed as golf ball materials. For example, highly neutralized ionomer resin materials obtained by blending a fatty acid and a basic inorganic metal compound in an ionomer resin composition are described in JP-A 2001-120686 and JP-A 2001-348467.

However, although such highly neutralized ionomer resin materials do exhibit a high rebound, a sufficiently soft feel is not achieved.

SUMMARY OF THE INVENTION

It is therefore an object of the present invention to provide a golf ball material that is soft and has an excellent rebound resilience. Further objects of the invention are to provide a method for producing such a golf ball material, and a golf ball made using this material.

As a result of intensive investigations, we have discovered that by mixing fine particles which have an average particle size of less than 300 μm and are composed of a crosslinked multi-component copolymer having conjugated diene units, non-conjugated olefin units and aromatic vinyl units together with a thermoplastic resin such as an acid-containing copolymer, the resulting mixture, when used as a golf ball material, has a low hardness and yet, surprisingly, is able to maintain a high rebound resilience, in addition to which it has a good processability. When this material is used in the cover to create a golf ball, it fully imparts a soft feel to the ball while at the same time having an excellent rebound resilience that enables the ball to achieve a high flight performance.

Accordingly, in a first aspect, the invention provides a golf ball material which includes:

(i) fine particles that have an average particle size of less than 300 μm and are composed of a crosslinked multi-component copolymer having conjugated diene units, non-conjugated olefin units and aromatic vinyl units; and (ii) a thermoplastic resin, wherein the conjugated diene units include butadiene units, the non-conjugated olefin units include units selected from the group consisting of ethylene, propylene and 1-butene units, the aromatic vinyl units include styrene units, and the content of the conjugated diene units in the multi-component copolymer is 5 wt % or more.

In a preferred embodiment of the golf ball material of the invention, the thermoplastic resin serving as component (ii) is a resin selected from the group consisting of acid-containing copolymers, polyester resins, thermoplastic polyester elastomers, polyamide resins, thermoplastic polyamide elastomers, polyurethane resins and unsaturated polyester resins.

In another preferred embodiment of the inventive golf ball material, the content of the conjugated diene units is at least 10 wt %, the content of the non-conjugated olefin units is not more than 90 wt % and the content of the aromatic vinyl units is not more than 30 wt % with respect to the multi-component copolymer serving as component (i).

In still another preferred embodiment of the golf ball material, the non-conjugated olefin units are ethylene units.

In yet another preferred embodiment of the golf ball material, the multi-component copolymer serving as component (i) is a copolymer polymerized with a gadolinium metallocene complex catalyst.

In a further preferred embodiment of the golf ball material, the content of component (ii) relative to the combined amount of components (i) and (ii) is from 20 to 80 wt %.

In a still further preferred embodiment, the golf ball material has a hardness on the Shore D scale of from 25 to 65.

In a yet further preferred embodiment, the golf ball material is a golf ball cover material.

In a second aspect, the invention provides a method for producing the golf ball material according to the first aspect of the invention, which method includes the steps of:

(a1) preparing a crosslinked multi-component copolymer by adding a crosslinking agent to a multi-component copolymer having conjugated diene units, non-conjugated olefin units and aromatic vinyl units, wherein the conjugated diene units include butadiene units, the non-conjugated olefin units include units selected from the group consisting of ethylene, propylene and 1-butene units, the aromatic vinyl units include styrene units and the content of conjugated diene units in the multi-component copolymer is 5 wt % or more;

(a2) subjecting the crosslinked multi-component polymer to size reduction to obtain a fine powder having an average particle size of less than 300 μm; and (a3) kneading a thermoplastic resin with the fine particles.

In a preferred embodiment of the inventive method, the thermoplastic resin in step (a3) is a resin selected from the group consisting of acid-containing copolymers, polyester resins, thermoplastic polyester elastomers, polyamide resins, thermoplastic polyamide elastomers, polyurethane resins and unsaturated polyester resins.

In another preferred embodiment of the inventive method, the multi-component copolymer in step (a1) has a content of the conjugated diene units which is at least 10 wt %, a content of the non-conjugated olefin units which is not more than 90 wt % and a content of the aromatic vinyl units which is not more than 30 wt %.

In yet another preferred embodiment of the inventive method, the non-conjugated olefin units are ethylene units.

In still another preferred embodiment of the inventive method, the mixing ratio by weight of thermoplastic resin to fine particles in step (a3) is from 20:80 to 80:20.

In a third aspect, the invention provides a golf ball having a core of one or more layer and a cover of one or more layer encasing the core, wherein at least one layer of the cover is formed of the golf ball material of the invention.

Advantageous Effects of the Invention

The golf ball material of the invention is soft and has an excellent rebound resilience. In addition, it has an excellent kneadability. Golf balls which use this material in the cover provide golfers with a competitive edge.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

The golf ball material of the invention is characterized by including components (i) and (ii) below:
  (i) fine particles that have an average particle size of less than 300 μm and are composed of a crosslinked multi-component copolymer having conjugated diene units, non-conjugated olefin units and aromatic vinyl units; and
  (ii) a thermoplastic resin.

Component (i) is a multi-component copolymer having conjugated diene units, non-conjugated olefin units and aromatic units. This multi-component copolymer is the multi-component copolymer disclosed in JP No. 6780827, and is described below.

Conjugated Diene Units

The multi-component copolymer includes conjugated diene units. The conjugated diene units are structural units from a conjugated diene compound serving as a monomer. Because the multi-component copolymer can be polymerized using a conjugated diene compound as a monomer, compared with copolymers obtained by polymerization using a known non-conjugated diene compound such as EPDM, it has excellent crosslinking properties. The conjugated diene compound includes a butadiene unit. The butadiene unit is a structural unit from a butadiene compound. Specific examples of the butadiene compound include 1,3-butadiene, isoprene, 1,3-pentadiene and 2,3-dimethyl-1,3-butadiene. The conjugated diene units in the multi-component copolymer preferably include 1,3-butadiene units, and more preferably consist solely of 1,3-butadiene units.

The multi-component copolymer has a cis-1,4 bond content in the overall conjugated diene units that is preferably at least 50%, more preferably at least 70%, even more preferably at least 80%, and still more preferably at least 90%. Such a multi-component copolymer having a high cis-1,4 bond content in the overall conjugated diene units can be obtained by using as the monomers a conjugated diene compound, a non-conjugated olefin compound and an aromatic vinyl compound. The content of vinyl bonds (1,2-vinyl bonds, 3,4-vinyl bonds, etc.) in the conjugated diene units overall is preferably 30% or less, more preferably 15% or less, even more preferably 10% or less, and still more preferably 6% or less. Also, the trans-1,4 bond content in the overall conjugated diene units is preferably 30% or less, more preferably 15% or less, and even more preferably 10% or less. The respective contents of cis-1,4 bonds, trans-1,4 bonds and vinyl bonds can be determined by the integrated area ratios from $^1$H-NMR and $^{13}$C-NMR measurement results.

The conjugated diene compound may be of one type used alone or two or more types may be used together. That is, the multi-component copolymer may include one type of conjugated diene unit alone or may include two or more types. The content of conjugated diene units must be at least 5 wt %, and is preferably at least 10 wt %, and more preferably at least 15 wt %, of the overall multi-component copolymer. The content of conjugated diene units is preferably 80 wt % or less, more preferably 60 wt % or less, and even more preferably 50 wt % or less, of the overall multi-component copolymer.

Non-Conjugated Olefin Units

The multi-component copolymer includes non-conjugated olefin units. The non-conjugated olefin units are structural units from a non-conjugated olefin compound serving as a monomer. The non-conjugated olefin compound is selected from the group consisting of ethylene, propylene and 1-butene. In particular, to fully impart the golf ball material with rebound resilience and softness, it is preferable for the non-conjugated olefin units to be ethylene units.

The non-conjugated olefin compound may be of one type used alone, or two or more types may be used together. That is, the multi-component copolymer may contain one type of non-conjugated olefin unit, or may contain two or more types. The content of non-conjugated olefin units is preferably more than 20 wt % and less than 90 wt % of the overall multi-component copolymer, and is more preferably from 30 to 85 wt %, even more preferably from 40 to 80 wt %, and most preferably from 45 to 75 wt %.

Aromatic Vinyl Units

The multi-component copolymer includes aromatic vinyl units. The aromatic vinyl units are structural units from an aromatic vinyl compound serving as a monomer. Specific examples of the aromatic vinyl compound include styrene compounds such as styrene, o-methylstyrene, m-methylstyrene, p-methylstyrene, o,p-dimethylstyrene, o-ethylstyrene, m-ethylstyrene and p-ethylstyrene. The aromatic vinyl units in the multi-component copolymer include styrene units, and preferably consist only of styrene units. The aromatic rings in the aromatic vinyl units, unless bonded to a neighboring unit, are not included on the copolymer main chain.

The aromatic vinyl compound may be of one type used alone, or two or more types may be used together. That is, the multi-component copolymer may contain one type of aromatic vinyl unit, or may contain two or more types. It is preferable for the content of aromatic vinyl units to be from 3 to 30 wt % of the overall multi-component copolymer. At an aromatic vinyl unit content of less than 3 wt % or more than 30 wt %, the lengths of the non-conjugated olefin moieties on the copolymer cannot be controlled, and so an improvement in durability due to non-conjugated olefin crystals is not achieved. The aromatic vinyl unit content is preferably from 3 to 30 wt %, more preferably from 5 to 25 wt %, and even more preferably from 10 to 20 wt %, of the overall multi-component copolymer.

The number of types of monomers in the multi-component copolymer is not particularly limited, provided that the multi-component copolymer includes conjugated diene units, non-conjugated olefin units and aromatic vinyl units. The multi-component copolymer may also include constituent units other than conjugated diene units, non-conjugated olefin units and aromatic vinyl units. The content of such other constituent units, from the standpoint of obtaining the desired effects, is preferably not more than 30 wt %, more preferably not more than 20 wt %, and even more preferably not more than 10 wt %, of the overall multi-component copolymer. The absence of any such other constituent units, that is, a content of 0 wt %, is especially preferred.

The multi-component copolymer is, at the very least, a multi-component copolymer having one type of conjugated diene unit, one type of non-conjugated olefin unit and one type of aromatic vinyl unit. Also, from the standpoint of imparting good failure characteristics, the multi-component copolymer is preferably a polymer obtained by polymerization using as the monomers at least one type of conjugated diene compound, one type of non-conjugated olefin compound and one type of aromatic vinyl compound.

The multi-component copolymer is more preferably a ternary copolymer consisting entirely of one type of conjugated diene unit, one type of non-conjugated olefin unit and one type of aromatic vinyl unit, and is even more preferably a ternary copolymer consisting entirely of 1,3-butadiene units, ethylene units and styrene units. Here, "one type of conjugated diene unit" encompasses conjugated diene units of differing bonding modes.

One major feature of the multi-component copolymer is that it contains conjugated diene units, non-conjugated olefin units and aromatic vinyl units and that the main chain consists entirely of acyclic structures. When the main chain has cyclic structures, the failure characteristics (especially the elongation at break) decrease. NMR spectroscopy may be used as the chief measurement means for ascertaining whether the main chain of the multi-component copolymer has cyclic structures. Specifically, when peaks attributable to cyclic structures present on the main chain (e.g., in the case of three-membered rings to five-member rings, peaks appearing at 10 to 24 ppm) are not observed, this indicates that the main chain of the multi-component copolymer consists solely of acyclic structures. The multi-component copolymer, as described below in the method of preparation therefor, may be synthesized in a single reactor, i.e., by one-pot synthesis, and thus can be prepared by a simplified process.

The multi-component copolymer has a polystyrene-equivalent weight-average molecular weight (Mw) of preferably from 10,000 to 10,000,000, more preferably from 100,000 to 9,000,000, and even more preferably from 150,000 to 8,000,000. By setting the Mw of the multi-component copolymer to at least 10,000, a standard strength for golf ball materials can be fully ensured; by setting Mw to 10,000,000 or less, a high workability can be maintained. The above weight-average molecular weight and molecular weight distribution are determined by gel permeation chromatography (GPC) using polystyrene as the reference material.

The chain structure of the multi-component copolymer is not particularly limited and may be suitably selected according to the intended purpose. For example, letting the conjugated diene units be A, the non-conjugated olefin units be B and the aromatic vinyl units be C, the copolymer may be a block copolymer having an Ax-By-Cz construction (wherein x, y and z are integers of 1 or more), a random copolymer with a construction in which A, B and C are randomly arranged, a tapered copolymer in which a random copolymer and a block copolymer are intermingled, or an alternating copolymer with an (A-B-C)w construction (wherein w is an integer of 1 or more). The multi-component copolymer may have a structure in which the conjugated diene units, non-conjugated olefin units and aromatic vinyl units are linearly connected (linear structure), or may have a structure in which at least the conjugated diene units, the non-conjugated olefin units or the aromatic vinyl units are connected so as to form a branched chain (branched structure). In cases where the multi-component copolymer has a branched structure, the branched chain may be made a binary or multi-component chain (i.e., the branched chain may include at least two from among the conjugated diene units, non-conjugated olefin units and aromatic vinyl units). Therefore, even among multi-component copolymers, a multi-component copolymer with a branched structure having a binary or multi-component branched chain can be clearly distinguished from a conventional graft copolymer in which the main chain and the side chains are each formed of one differing type of unit.

The multi-component copolymer production method, polymerization steps and production conditions used, such as the polymerization catalyst, may be as described in the specification of JP No. 6780827. It is preferable for the multi-component copolymer to be one polymerized by means of a gadolinium metallocene complex catalyst.

Component (i) is a crosslinked product obtained by adding a crosslinking agent to the multi-component copolymer and crosslinking the copolymer. The crosslinked product is then subjected to size reduction so as to give fine particles having an average particle size of less than 300 µm.

The crosslinking agent used may be, for example, an organic peroxide or other radical polymerization initiator or may be a co-crosslinking agent such as zinc acrylate or zinc methacrylate. These crosslinking agents are included in an amount, per 100 parts by weight of the multi-component polymer, of preferably from 0.1 to 10 parts by weight, and more preferably from 0.2 to 5 parts by weight.

The crosslinked product can be prepared by molding, under applied heat at between 100° C. and 200° C. for a period of 1 to 60 minutes, the composition obtained by adding the crosslinking agent to the multi-component copolymer.

The crosslinked multi-component copolymer is then subjected to size reduction so as to obtain fine particles having an average particle size of less than 300 µm. Specific means for obtaining fine particles of the crosslinked multi-component copolymer having a predetermined average particle size include fine grinding mills such as milling machines, ball mills, roller mills, jet mills, high-speed rotary mills and container-driven mills, and ultrafine grinding mills such as media agitating mills. The material being milled is subjected to size reduction by having compressive, impact, rotational and other forces act upon it. Fine particles having an average particle size of less than 300 µm can be obtained by suitably adjusting these forces. In terms of impact, aside from having particles of the material mutually collide, it is also effective to cause the material being milled to collide with a grinding medium. Prior to particle formation with a grinding mill, the crosslinked multi-component copolymer may first be cut up into very small pieces.

The fine particles of the crosslinked multi-component copolymer have an average particle size of less than 300 μm, and preferably from 50 and 250 μm. At an average particle size larger than this, the kneadability of the multi-component copolymer with the subsequently described thermoplastic resin worsens and it may be difficult to ultimately achieve a high-quality golf ball. That is, in this invention, the multi-component copolymer is not simply mixed (kneaded) with the subsequently described thermoplastic resin; it is mixed, in the form of fine particles of the crosslinked multi-component polymer, with the thermoplastic resin. Hence, the kneadability is good and, in a method for producing golf balls, the processability (moldability) is good, enabling high-quality material properties to be reliability obtained, which in turn enhances the physical properties of the golf ball.

The average particle size of the fine particles can be measured using a microscope. For example, the long axis (length) of the particles can be measured using the VHX-2000 digital microscope from KEYENCE Corporation, and this value treated as the particle size.

Next, the fine particles of crosslinked multi-component copolymer obtained as described above are mixed together with a thermoplastic resin as component (ii) of the invention. A resin material commonly used as a golf ball material may be used at this time as the thermoplastic resin. Specific examples include resins selected from the group consisting of acid-containing copolymers, polyester resins, thermoplastic polyester elastomers, polyamide resins, thermoplastic polyamide elastomers, polyurethane resins and unsaturated polyester resins.

The acid-containing copolymer is a resin in which the acid is one selected from carboxylic acids (including carboxylic anhydrides and derivatives thereof), dicarboxylic acids (which includes, here and below, half-ester carboxylic acids), sulfonic acids and phosphoric acids. A resin that is a carboxylic acid is especially preferred. Specific examples of such acid-containing copolymers include olefin-α,β-unsaturated carboxylic acid copolymers and olefin-α,β-unsaturated carboxylic acid-α,β-unsaturated carboxylic acid ester copolymers.

The olefin in the above copolymer generally has at least two carbon atoms, with the upper limit being preferably up to eight carbon atoms, and especially up to six carbon atoms. Specific examples include ethylene, propylene, butene, pentene, hexene, heptene and octene. Ethylene is especially preferred. Examples of the unsaturated carboxylic acid in component (a) include acrylic acid, methacrylic acid, maleic acid and fumaric acid, with acrylic acid and methacrylic acid being especially preferred. The unsaturated carboxylic acid ester in the copolymer is preferably a lower alkyl ester of the above unsaturated carboxylic acid, specific examples of which include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The acid-containing copolymer may be one that is neutralized with metal ions. Specific examples include ones that can be obtained by partially neutralizing acid groups on the above olefin-unsaturated carboxylic acid (or olefin-unsaturated carboxylic acid-unsaturated carboxylic acid ester) copolymer with metal ions. The metal ions that neutralize the acid groups are exemplified by $Na^+$, $K^+$, $Li^+$, $Zn^{++}$, $Cu^{++}$, $Mg^{++}$, $Ca^{++}$, $Co^{++}$, $Ni^{++}$ and $Pb^{++}$, with the use of $Na^+$, $Li^+$, $Zn^{++}$, $Mg^{++}$ and $Ca^{++}$ being especially preferred. These neutralization products can be obtained by a known method. For example, the neutralization product may be obtained by using compounds such as formates, acetates, nitrates, carbonates, bicarbonates, oxides, hydroxides or alkoxides of these metal ions in the above copolymer.

A known product may be used as the acid-containing copolymer. Examples of commercially available products that may be used as the acid-containing copolymer include Nucrel® 1560, Nucrel® N1214, Nucrel® N1035, Nucrel® N2060, Nucrel® AN4221C, Nucrel® AN4311 and Nucrel® AN4319 (all products of Dow-Mitsui Polychemicals Co., Ltd.). Examples of commercially available products that may be used as a metal ion neutralization product of the acid-containing copolymer include Himilan® 1554, Himilan® 1557, Himilan® 1601, Himilan® 1605, Himilan® 1706, Himilan® AM7311, Himilan® 1855, Himilan® 1856, Himilan® AM7316, Himilan® AM7318 and Himilan® AM7327 (all products of Dow-Mitsui Polychemicals Co., Ltd.), and Surlyn® 7930, Surlyn® 6320, Surlyn® 8660, Surlyn® 8320, Surlyn® 9320 and Surlyn® 8120 (all products of The Dow Chemical Company).

The mixing ratio of the thermoplastic resin of component (ii) with the fine particles of component (i), expressed as the weight ratio (i):(ii), is preferably in the range of 20:80 to 80:20. That is, the content of component (ii) relative to the combined amount of components (i) and (ii) is preferably within the range of 20 to 80 wt %.

Various additives may be optionally included in the golf ball material of the invention. For example, pigments, dispersants, antioxidants, light stabilizers, ultraviolet absorbers and internal mold release agents may be suitably included.

The golf ball material of the invention can be obtained by mixing together component (i), component (ii) and various optional additives, either all at the same time or in a stepwise manner, using any of various types of mixers, such as a kneading-type twin-screw extruder, a Banbury mixer, a kneader or a Labo Plastomill. The extruder used for production may be either a single-screw extruder or a twin-screw extruder, although a twin-screw extruder is more preferred.

The golf ball material of the invention has a rebound resilience, measured in accordance with JIS-K 6255, which is preferably at least 45%, and more preferably at least 49%. When the rebound resilience is too small, a reduction in the initial velocity of the ball on approach shots can be achieved, but the distance on driver shots decreases markedly.

The golf ball material of the invention has a material hardness on the Shore D hardness scale which, in terms of the spin performance and soft feel obtainable in golf balls made using this material, is preferably at least 25 and more preferably at least 35, and has an upper limit of preferably not more than 75, more preferably not more than 65 and even more preferably not more than 60.

The golf ball material of the invention may be used in particular as the cover material in two-piece solid golf balls made of a core and a cover encasing the core, or as the cover materials (intermediate layer and outermost layer) in multi-piece solid golf balls made of a core of one or more layer and a multilayer cover encasing the core.

The constituent members of golf balls in which the golf ball material of the invention is used are described below.

The core may be formed using a known rubber material as the base. A known rubber such as a natural rubber or a synthetic rubber may be used as the base rubber. More specifically, the use of primarily polybutadiene, especially cis-1,4-polybutadiene having a cis structure content of at least 40%, is recommended. Where desired, natural rubber, polyisoprene rubber, styrene-butadiene rubber or the like may be used together with the above polybutadiene in the base rubber.

The polybutadiene used may be one synthesized with a rare-earth catalyst such as a neodymium catalyst or with a metal catalyst such as a cobalt catalyst or nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. Where necessary, commercial antioxidants and the like may also be suitably added.

The core diameter is suitably selected according to the ball structure. Although not particularly limited, the core diameter is preferably at least 20 mm, more preferably at least 25 mm, and even more preferably at least 30 mm. The upper limit is preferably not more than 41 mm, and more preferably not more than 40 mm.

An intermediate layer may be provided between the core and the cover outermost layer. In this case, the intermediate layer has a material hardness on the Shore D scale which, although not particularly limited, may be set to typically at least 50, preferably at least 55, and more preferably at least 60. The material hardness is preferably not more than 70, and more preferably not more than 65.

The outermost layer of the cover has a thickness which, although not particularly limited, is preferably at least 0.3 mm, more preferably at least 0.4 mm, and even more preferably at least 0.5 mm. The thickness is preferably not more than 1.2 mm, more preferably not more than 1.0 mm, and even more preferably not more than 0.8 mm.

Numerous dimples of one or more type may be formed on the surface of the cover. Also, various types of coatings may be applied to the cover surface. Because the coating must be capable of enduring the harsh conditions of golf ball use, a two-part curable urethane coating, especially a non-yellowing urethane coating, is preferred.

The method used to obtain the cover may be, for example, a method in which, depending on the type of ball being produced, a pre-fabricated single-layer core or multilayer core of two or more layers is placed in a mold and the above mixture is mixed and melted under heating and then injection-molded over the core, thereby encasing the core with the desired cover. In this case, cover production can be carried out in a state where excellent thermal stability, flowability and moldability are ensured, as a result of which the golf ball ultimately obtained has a high rebound and also a good feel at impact. Another method that may be used to form the cover involves molding the cover material beforehand into a pair of hemispherical half-cups, enclosing the core with these half-cups, and then molding under applied pressure at between 120° C. and 170° C. for 1 to 5 minutes.

EXAMPLES

The following Examples and Comparative Examples are provided to illustrate the invention, and are not intended to limit the scope thereof.

Examples 1 to 8, Comparative Examples 1 to 12

Solid cores having a diameter of 38.7 mm are produced for each Example by using the rubber composition composed primarily of polybutadiene that is shown in Table 1 and common to all the Examples and Comparative Examples, and vulcanizing at 152° C. for 19 minutes.

TABLE 1

| Core composition (amounts in pbw) | Common to all Examples |
| --- | --- |
| Polybutadiene | 100 |
| Zinc acrylate | 39.6 |
| Organic peroxide | 1.0 |
| Antioxidant | 0.1 |
| Zinc oxide | 15.0 |
| Zinc salt of pentachlorothiophenol | 0.7 |
| Zinc dimethacrylate | 1.0 |
| Water | 0.6 |

Details on the above core materials are given below.

Polybutadiene: Available under the trade name "BR51" from JSR Corporation.

Zinc acrylate: "ZN-DA85S" from Nippon Shokubai Co., Ltd.

Organic peroxide: Dicumyl peroxide, available as Percumyl® D from NOF Corporation Antioxidant: Available under the trade name "Nocrac N56" from Ouchi Shinko Chemical Industry Co., Ltd.

Zinc oxide: Available as "Grade 3 Zinc Oxide" from Sakai Chemical Co., Ltd.

Zinc salt of pentachlorothiophenol:

Available from Wako Pure Chemical Industries, Ltd.

Zinc dimethacrylate: Available from Wako Pure Chemical Industries, Ltd.

Water: Pure water (from Seiki Chemical Industrial Co., Ltd.)

Formation of Cover Layers (Intermediate Layer and Outermost Layer)

Next, the resin composition shown in Table 2 below is injection-molded over the core obtained as described above, thereby producing an intermediate layer-encased sphere composed of the core encased by an intermediate layer having a thickness of 1.2 mm and a Shore D hardness of 66.

TABLE 2

| Resin composition (amounts in pbw) | Common to all Examples |
| --- | --- |
| AM7318 | 85 |
| Himilan ® 1706 | 15 |
| Trimethylolpropane | 1.1 |

Details on the ingredients in the table are given below.

AM 7318: An ionomer resin available from Dow-Mitsui Polychemicals Co., Ltd.

Himilan® 1706: An ionomer resin available from Dow-Mitsui Polychemicals Co., Ltd.

Trimethylolpropane: Available from Tokyo Chemical Industry Co., Ltd.

The resin compositions shown in Tables 3 and 4 below are then kneaded in a Labo Plastomill at 160° C. for 30 minutes, following which they are injection-molded over the intermediate layer-encased spheres, thereby producing spheres encased by an outermost layer having a thickness of 0.8 mm (three-piece golf balls). Dimples common to all the Examples and Comparative Examples are formed at this time on the cover surface.

Details on the materials in Tables 3 and 4 are given below.
AM7318: An ionomer resin from Dow-Mitsui Polychemicals Co., Ltd.
AM7327: An ionomer resin from Dow-Mitsui Polychemicals Co., Ltd.
Daiamid E62: a polyamide 12 elastomer from Daicel Evonik Ltd.
Multi-Component Copolymer A: see below for details
Multi-Component Copolymer B: see below for details
Crosslinked Multi-Component Copolymer A:
see below for details
Crosslinked Multi-Component Copolymer B:
see below for details Multi-Component Copolymer A Ninety-five grams of styrene and 400 mL of toluene are added to a thoroughly dried 1,000 mL stainless steel pressure reactor.

Within a glovebox under a nitrogen atmosphere, a glass vessel is charged with 0.17 mmol of mono(bis(1,3-tert-butyldimethylsilyl)indenyl) bis(bis(dimethylsilyl)amido)gadolinium complex (1,3-[(t-Bu)Me$_2$Si]$_2$C$_9$H$_5$Gd[N(SiHMe$_2$)$_2$]$_2$), 0.187 mmol of dimethylanilinium tetrakis (pentafluorophenyl)borate (Me$_2$NHPhB(C$_6$F$_5$)$_4$) and 1.4 mmol of diisobutylaluminum hydride, and 40 mL of toluene is added to give a catalyst solution.

This catalyst solution is added to the stainless steel pressure reactor and the system is heated to 70° C.

Ethylene is then introduced under a pressure of 1.5 MPa into the stainless steel pressure reactor, in addition to which 150 mL of a toluene solution containing 27 g of 1,3-butadiene is introduced into the reactor over a 30-minute period and copolymerization is carried out at 70° C. for 6 hours. A toluene solution (150 mL) containing 27 g of 1,3-butandiene is then introduced into the reactor over a 30-minute period and copolymerization is additionally carried out at 70° C. for 1 hour.

Next, 1 mL of a 5 wt % isopropanol solution of 2,2'-methylenebis(4-ethyl-6-t-butylphenol) (NS-5) is added to the stainless steel pressure reactor, stopping the reaction.

The copolymer is then separated off using a large amount of methanol and vacuum-dried at 50° C., giving Copolymer A.

Multi-Component Copolymer B

Eighty grams of styrene and 600 mL of toluene are added to a thoroughly dried 1,000 mL stainless steel pressure reactor.

Within a glovebox under a nitrogen atmosphere, a glass vessel is charged with 0.25 mmol of mono(bis(1,3-tert-butyldimethylsilyl)indenyl) bis(bis(dimethylsilyl)amido)gadolinium complex (1,3-[(t-Bu)Me$_2$Si]$_2$C$_9$H$_5$Gd[N(SiHMe$_2$)$_2$]$_2$), 0.275 mmol of dimethylanilinium tetrakis (pentafluorophenyl)borate (Me$_2$NHPhB(C$_6$F$_5$)$_4$) and 1.1 mmol of diisobutylaluminum hydride, and 40 mL of toluene is added to give a catalyst solution.

This catalyst solution is added to the stainless steel pressure reactor and the system is heated to 70° C.

Ethylene is then introduced under a pressure of 1.5 MPa into the stainless steel pressure reactor, in addition to which 80 mL of a toluene solution containing 20 g of 1,3-butadiene is introduced into the reactor over a period of 8 hours and copolymerization is carried out at 70° C. for a total of 8.5 hours.

Next, 1 mL of a 5 wt % isopropanol solution of 2,2'-methylenebis(4-ethyl-6-t-butylphenol) (NS-5) is added to the stainless steel pressure reactor, stopping the reaction.

The copolymer is then separated off using a large amount of methanol and vacuum-dried at 50° C., giving Copolymer B.

The butadiene, ethylene and styrene contents (wt %) of Multi-Component Copolymer A and Multi-Component Copolymer B are measured and evaluated as follows.

Butadiene, Ethylene and Styrene Contents:

The butadiene, ethylene and styrene contents of each copolymer are determined by $^1$H-NMR measurement. The results are given below.

Multi-Component Copolymer A: butadiene/ethylene/styrene=32/49/19 (wt %); weight-average molecular weight (Mw), 375×10$^3$ Multi-Component Copolymer B: butadiene/ethylene/styrene=14/70/16 (wt %); weight-average molecular weight (Mw), 273×10$^3$ Powder of Crosslinked Multi-Component Copolymer A A composition prepared by adding 1.0 part by weight of dicumyl peroxide as the organic peroxide to 100 parts by weight of Multi-Component Copolymer A obtained above is molded into a sheet under applied heat at 160° C. for 30 minutes. The crosslinked molded sheet thus obtained is ground/milled using a milling machine and a ball mill, yielding a powder having an average particle size in the range of from 50 to 200 μm. The size of the particles is measured with a CCD camera equipped with a magnifying lens and particles within the above predetermined range are collected. This is referred to in the tables below as "Powder of Crosslinked Multi-Component Copolymer A."

Powder of Crosslinked Multi-Component Copolymer B

A composition prepared by adding 1.0 part by weight of dicumyl peroxide as the organic peroxide to 100 parts by weight of Multi-Component Copolymer B obtained above is molded under applied heat into a sheet at 160° C. for 30 minutes. The crosslinked molded sheet thus obtained is ground/milled using a milling machine and a ball mill, yielding a powder having an average particle size of not more than 200 μm. The size of the particles is measured with a CCD camera equipped with a magnifying lens and particles within the above predetermined range are collected. This is referred to in the tables below as "Powder of Crosslinked Multi-Component Copolymer B."

The material hardnesses and rebound resiliences of the cover in the above three-piece golf balls are measured as described below, giving the results shown in Tables 3 and 4 below.

Material Hardness of Cover (Shore D Hardness)

The cover-forming resin material is formed into 2 mm-thick sheets and left to stand for at least two weeks, following which the Shore D hardness is measured in accordance with ASTM D2240-95.

Rebound Resilience

The resin material is formed into 2 mm-thick sheets with a press, stacked to a thickness of 4 mm and temperature-conditioned to 23±1° C., following which measurement is carried out according to JIS-K 6255 (2013) using a tripsometer (the rebound resilience is measured after setting the angle of impact in JIS-K 6255 to 30 degrees).

Processability During Kneading

The processability when blending the resin ingredients in the respective Examples and kneading is evaluated according to the following criteria.

Good: Kneadability is good and so processability is excellent.

NG: Powder during kneading disperses with some difficulty, making processing a challenge —: Material is composed of a single ingredient, making kneading unnecessary.

TABLE 3

| Composition (pbw) | Example | | | | | | | |
|---|---|---|---|---|---|---|---|---|
| | 1 | 2 | 3 | 4 | 5 | 6 | 7 | 8 |
| Powder of Crosslinked Multi-Component Copolymer A | | | | 20 | 50 | | | |
| Powder of Crosslinked Multi-Component Copolymer B | 20 | 50 | 80 | | | 20 | 50 | 80 |
| AM7318 | 80 | 50 | 20 | 80 | 50 | | | |
| AM7327 | | | | | | | | |
| Daiamid E62 | | | | | | 80 | 50 | 20 |
| Multi-component copolymer A | | | | | | | | |
| Multi-component copolymer B | | | | | | | | |
| Material hardness (Shore D) | 61 | 51 | 39 | 60 | 49 | 60 | 51 | 43 |
| Rebound resilience (%) | 52.0 | 54.3 | 61.3 | 48.0 | 50.9 | 49.6 | 55.7 | 64.8 |
| Processability (during kneading) | good | good | NG | good | good | good | good | NG |

TABLE 4

| Composition (pbw) | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Powder of Crosslinked Multi-Component Copolymer A | | | | | | | | | | | | |
| Powder of Crosslinked Multi-Component Copolymer B | | | | | | | | | | | | |
| AM7318 | 100 | | | | | 80 | 50 | 80 | 50 | | | |
| AM7327 | | 100 | | | | | | | | | | |
| Daiamid E62 | | | | | 100 | | | | | 80 | 50 | 20 |
| Multi-component copolymer A | | | | 100 | | | | 20 | 50 | | | |
| Multi-component copolymer B | | | 100 | | | 20 | 50 | | | 20 | 50 | 80 |
| Material hardness (Shore D) | 66 | 47 | 30 | 29 | 67 | 59 | 53 | 57 | 46 | 61 | 51 | 34 |
| Rebound resilience (%) | 48.3 | 54.3 | 67.5 | 64.9 | 45.0 | 48.3 | 50.9 | 46.5 | 50.6 | 47.2 | 53.6 | 63.4 |
| Processability (during kneading) | — | — | — | — | — | good | good | good | good | good | good | good |

Figure 1:
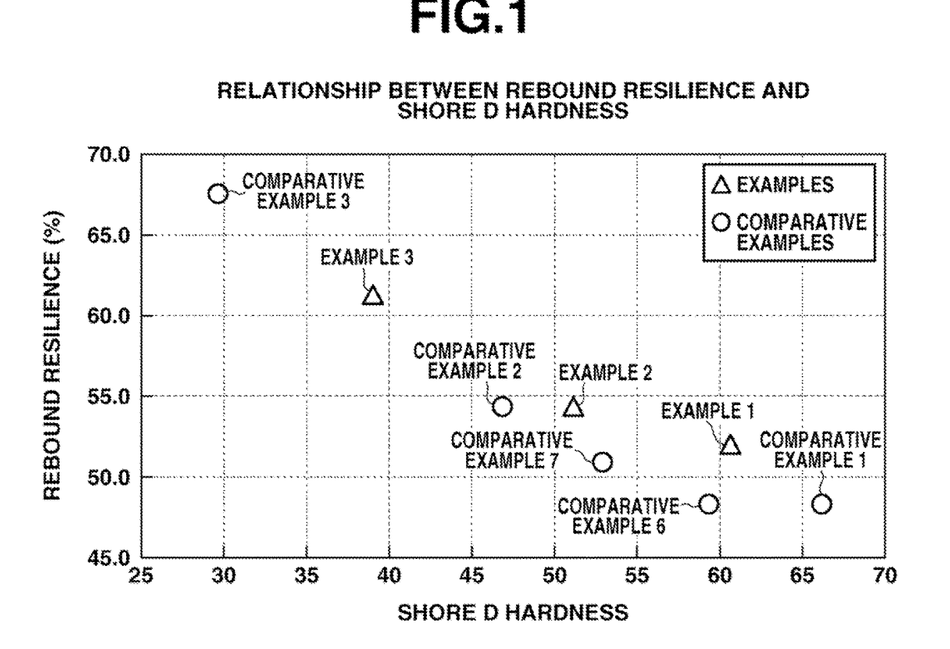
FIG. 1 is a graph showing the relationship between the Shore D hardness and the rebound resilience of the golf ball material in Examples 1 to 3 and Comparative Examples 1 to 3, 6 and 7.

FIG. 1 presents a graph showing the relationship between the material hardness and the rebound resilience of the golf ball materials in Examples 1 to 3 and Comparative Examples 1 to 3, 6 and 7 of Tables 3 and 4. The differences between these Examples and Comparative Examples are differences as to whether Multi-Component Copolymer B is blended directly as is with an ionomer resin or whether it is blended in the form of crosslinked fine particles (powder). The results, as shown in FIG. 1, indicate that the rebound resilience is higher in Examples 1 to 3 than in Comparative Examples 6 and 7.

Figure 2:
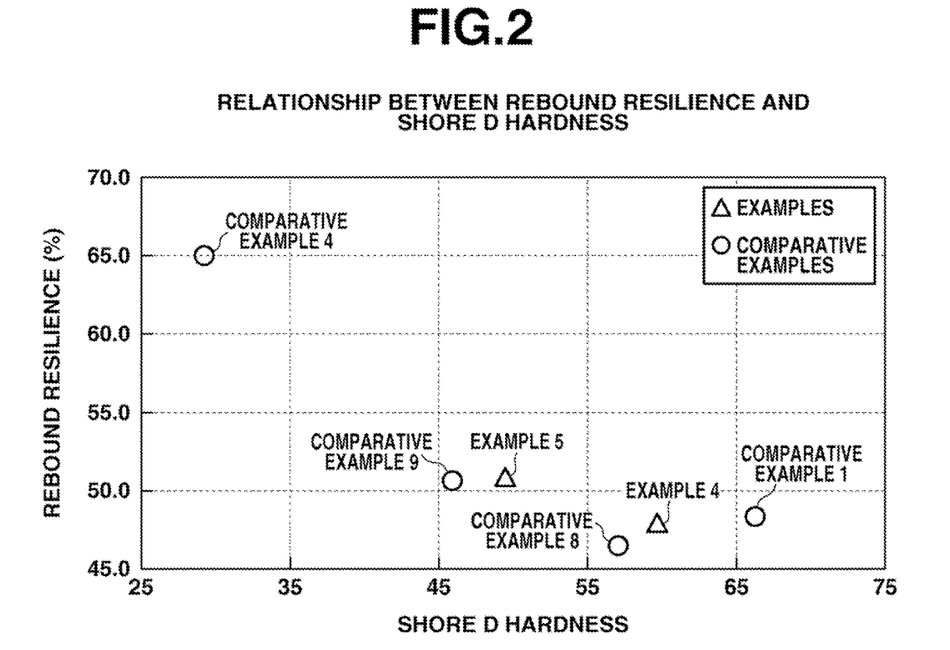
FIG. 2 is a graph showing the relationship between the Shore D hardness and the rebound resilience of the golf ball material in Examples 4 and 5 and Comparative Examples 6 and 7.

FIG. 2 presents a graph showing the relationship between the material hardness and the rebound resilience of the golf ball materials in Examples 4 and 5 and Comparative Examples 1, 4, 8 and 9 of Tables 3 and 4. The differences between these Examples and Comparative Examples are differences as to whether Multi-Component Copolymer A is blended directly as is with an ionomer resin or whether it is blended in the form of crosslinked fine particles (powder). The results, as shown in FIG. 2, indicate that the rebound resilience is higher in Examples 4 and 5 than in Comparative Examples 8 and 9.

Figure 3:
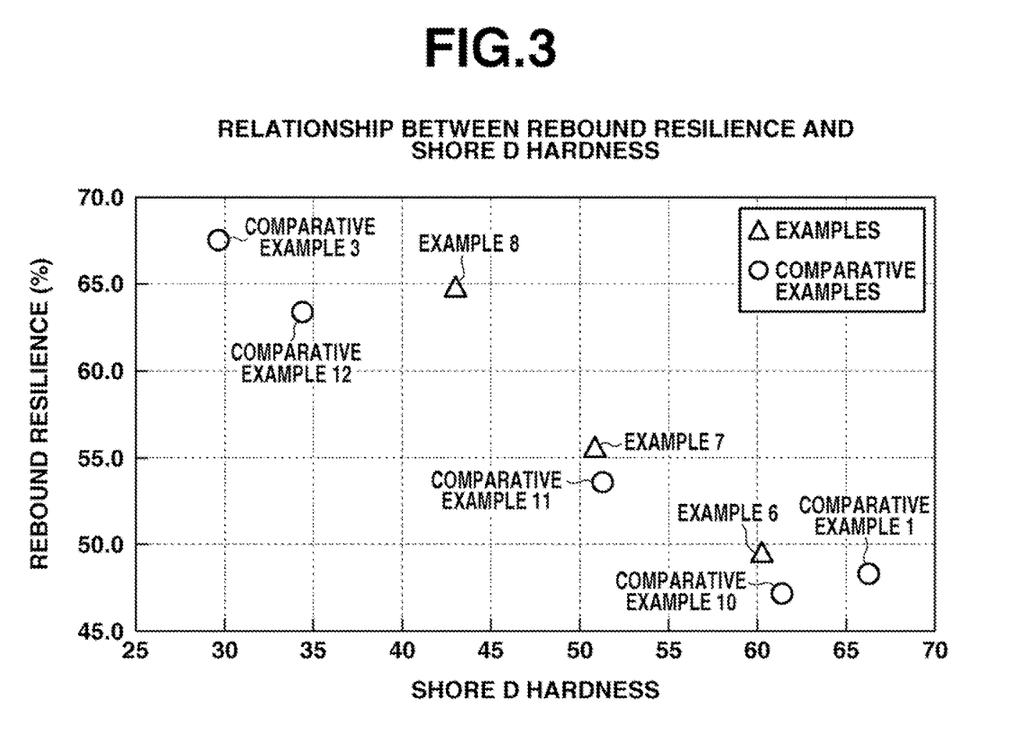
FIG. 3 is a graph showing the relationship between the Shore D hardness and the rebound resilience of the golf ball material in Examples 6 to 8 and Comparative Examples 10 to 12.

FIG. 3 presents a graph showing the relationship between the material hardness and the rebound resilience of the golf ball materials in Examples 6 to 8 and Comparative Examples 10 to 12 of Tables 3 and 4. The differences between these Examples and Comparative Examples are differences as to whether Multi-Component Copolymer B is blended directly as is with a polyamide elastomer resin or whether it is blended in the form of crosslinked fine particles (powder). The results, as shown in FIG. 3, indicate that the rebound resilience is higher in Examples 6 to 8 than in Comparative Examples 10 to 12.

Japanese Patent Application No. 2021-089776 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball having a core of one or more layer and a cover of one or more layer encasing the core, wherein at least one layer of the cover is formed of the material comprising:
   (i) fine particles that have an average particle size of less than 300 μm and are composed of a crosslinked multi-component copolymer having conjugated diene units, non-conjugated olefin units and aromatic vinyl units; and
   (ii) a thermoplastic resin,
   wherein the conjugated diene units include butadiene units, the non-conjugated olefin units include units selected from the group consisting of ethylene, propylene and 1-butene units, the aromatic vinyl units include styrene units, and the content of the conjugated diene units in the multi-component copolymer is 5 wt % or more.

2. The golf ball of claim 1, wherein the thermoplastic resin serving as component (ii) is a resin selected from the group consisting of acid-containing copolymers, polyester resins, thermoplastic polyester elastomers, polyamide resins, thermoplastic polyamide elastomers, polyurethane resins and unsaturated polyester resins.

3. The golf ball of claim 1, wherein the content of the conjugated diene units is at least 10 wt %, the content of the non-conjugated olefin units is not more than 90 wt % and the content of the aromatic vinyl units is not more than 30 wt % with respect to the multi component copolymer serving as component (i).

4. The golf ball of claim 1, wherein the non-conjugated olefin units are ethylene units.

5. The golf ball of claim 1, wherein the multi-component copolymer serving as component (i) is a copolymer polymerized with a gadolinium metallocene complex catalyst.

6. The golf ball of claim 1, wherein the content of component (ii) relative to the combined amount of components (i) and (ii) is from 20 to 80 wt %.

7. The golf ball of claim 1, wherein the material has a hardness on the Shore D scale of from 25 to 65.

\* \* \* \* \*